US006826968B2

(12) United States Patent
Manaresi et al.

(10) Patent No.: US 6,826,968 B2
(45) Date of Patent: Dec. 7, 2004

(54) TEXTILE-LIKE CAPACITIVE PRESSURE SENSOR AND METHOD OF MAPPING THE PRESSURE EXERTED AT POINTS OF A SURFACE OF A FLEXIBLE AND PLIABLE OBJECT, PARTICULARLY OF A SAIL

(75) Inventors: Nicolò Manaresi, Bologna (IT); Marco Tartagni, Meldola (IT); Joel Monnier, Ismiere (FR); Roberto Guerrieri, Bologna (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 115 days.

(21) Appl. No.: 09/996,070

(22) Filed: Nov. 28, 2001

(65) Prior Publication Data

US 2002/0121146 A1 Sep. 5, 2002

(30) Foreign Application Priority Data

Nov. 28, 2000  (EP) .............................................. 00830779

(51) Int. Cl.$^7$ .............................. G01L 3/00; G01L 1/12; G01L 1/04; G01L 1/22
(52) U.S. Cl. ............................ 73/862.046; 73/862.626; 73/862.628; 73/862.629
(58) Field of Search ..................... 73/862.046, 862.626, 73/862.628, 862.629, 862.337, 718

(56) References Cited

U.S. PATENT DOCUMENTS

| | | | | |
|---|---|---|---|---|
| 4,134,063 A | * | 1/1979 | Nicol et al. ............. 73/862.046 |
| 4,348,635 A | * | 9/1982 | Wright et al. .................. 73/784 |
| 4,437,138 A | * | 3/1984 | Nicol ..................... 73/862.046 |
| 4,526,043 A | * | 7/1985 | Boie et al. ............. 73/862.046 |
| 4,644,801 A | * | 2/1987 | Kustanovich .......... 73/862.046 |
| 4,827,395 A | * | 5/1989 | Anders et al. ............... 364/138 |
| 5,010,772 A | * | 4/1991 | Bourland et al. ...... 73/862.046 |
| 5,723,797 A | * | 3/1998 | Dimmick et al. .......... 73/865.8 |
| 5,920,454 A | * | 7/1999 | Nomura et al. ............. 361/313 |

FOREIGN PATENT DOCUMENTS

DE          30 25 362          1/1982        ............. G01L/1/14

* cited by examiner

*Primary Examiner*—Edward Lefkowitz
*Assistant Examiner*—Lilybett Martir
(74) *Attorney, Agent, or Firm*—Lisa K. Jorgenson; Allen, Dyer, Doppelt, Milbrath & Gilchrist, P.A.

(57) ABSTRACT

A device for detecting the pressure exerted at different points of a flexible and/or pliable object that may assume different shapes, includes a plurality of capacitive pressure sensors and at least a system for biasing and reading the capacitance of the sensors. The requirements of flexibility or pliability are satisfied by capacitive pressure sensors formed by two orthogonal sets of parallel or substantially parallel electrodes spaced, at least at each crossing between an electrode of one set and an electrode of the other set, by an elastically compressible dielectric, forming an array of pressure sensing pixel capacitors. The system for biasing and reading the capacitance includes column plate electrode selection circuits and row plate electrode selection circuits and a logic circuit for sequentially scanning the pixel capacitors and outputting pixel values of the pressure for reconstructing a distribution map of the pressure over the area of the array.

24 Claims, 7 Drawing Sheets

A-A$^1$ section

B-B$^1$ section

TEXTILE-LIKE CAPACITIVE PRESSURE SENSOR AND METHOD OF MAPPING THE PRESSURE EXERTED AT POINTS OF A SURFACE OF A FLEXIBLE AND PLIABLE OBJECT, PARTICULARLY OF A SAIL

FIELD OF THE INVENTION

The present invention relates to the field of sensors, and, more particularly, to techniques and devices for sensing pressure exerted at points of a flexible and pliable object in different shapes.

BACKGROUND OF THE INVENTION

There are several applications for a device capable mapping the pressure and of providing images of the map distribution of the pressure exerted onto a certain surface, not plane nor rigid, but flexible and pliable to conform to different shapes. For example, in the field of the so-called "intelligent" toys, but more generally in the field of the manufacturing of intelligent robots, an external covering of the puppet or of the robot could advantageously incorporate sensors distributed in a more or less uniform way on the surface of the flexible and pliable covering material, capable of outputting data representative of a picture of the map distribution of the pressure exerted onto the external surface of the pliable covering. The artificial intelligence incorporated in the device or in the robot could then be able, by reading the real-time map distribution of the pressure of distinguishing for example the distribution map of the pressure exerted by a hand of an adult that may press or handle the toy from that produced by the hand of a child, to discriminate whether the action of the hand is a caress or a strong clasp or a stroke.

Another important field of use of such a bidimensional pressure sensor may concern the problem of detecting systematically the pressure or better the distribution map of the pressure acting on the windward and leeward faces of a sail to optimize its trim by acting onto the numerous devices for regulating the shape and the orientation of the sail in function of the apparent wind. To this aim, classic differential pressure sensors formed by capillaries held close to one face and to the other face of the sail have been used but they are able to provide only an indication of the locally sensed pressure at the position of the capillaries.

The problem of sensing the distribution of the pressure over the whole or a significant portion of the sail surface such to provide a distribution map of the pressure field acting onto the sail has not been resolved yet. Even the optimization of the trim of the sail based on the observation and/or the instrumental detection of a laminar or turbulent character of the air flow at different points of the sail surface, suitably equipped with light ribbons fixed as flags onto the sail surface, is not accurate and cannot be readily managed with modern real time data acquisition and elaboration systems.

There are bidimensional capacitive pressure sensors developed primarily for realizing the so called "touch pads" of portable PC that allow the reconstruction of the position of an object weighing onto the surface of the sensor. U.S. Pat. No. 5,374,787 describes a sensor of the position of such an object onto a sensible surface.

Nevertheless, these known devices are realized with manufacturing techniques of printed circuit boards (PCB), according to which a substrate of fiber-glass or of mylar® is provided with copper orthogonal stripes defined on one or on the other face of the substrate. Notwithstanding that a substrate of mylar or of another dielectric material may be moderately flexible, at least for small deflections, the sensor so constructed remains substantially rigid and not pliable into different geometric shapes because the copper stripes defined onto the substrate's surface would break.

It is evident that the known devices are unsuitable to dress a toy or a robot, or to be incorporated in a sail or in any other object that must retain flexibility and pliability to conform to different shapes as a fabric.

SUMMARY OF THE INVENTION

An object of the present invention is to provide a device for sensing the pressure exerted at different points of a surface of a flexible and pliable object and a bidimensional pressure sensor formed an array of capacitors integrable or applicable to a flexible and pliable object.

These and other objects are met by the present invention in which a bidimensional capacitive pressure sensor includes a plurality of capacitors formed by two mutually orthogonal sets of plates parallel or almost parallel to each other separated, at least in correspondence of the crossing areas between electrodes belonging to one and the other set, by a layer of an elastically compressible dielectric material, having an array or matrix of column plates and row plates separated, at least at crossings, by the elastically compressible dielectric. The system for biasing and reading capacitances comprises circuits for selecting a column and a row plate and a sequential control logic circuitry of the column and row selection circuits for generating read values of the pressure each relative to a single pixels represented by the capacitor realized in the superposition or crossover area of a selected column plate with a selected row plate.

According to a first embodiment, each of the two arrays of parallel electrodes may be realized in the form of a fabric composed of weft oriented threads of a dielectric material and of warp oriented threads alternately of a conducting material and of a dielectric material (or even viceversa). The threads of conducting material of the fabric form the parallel electrodes of a respective array and two fabrics of this kind are firmly fixed onto the opposite faces of a dielectric layer, for example a latex layer or of an elastically compressible expanded plastic material, orienting the fabrics so that the threads of conducting material of one array are orthogonal to the threads of conducting material of the other.

Alternatively, the two arrays of parallel plates or substantially (quasi) parallel plate electrodes or short plates may be realized in the form of parallel stripes of a conducting paint applied onto a respective face of a dielectric layer or multilayer comprising at least a layer of latex or of an elastically compressible expanded plastic material. Still alternatively, the two arrays of electrodes parallel or substantially so may be formed by a plurality of stripes of adhesive tape incorporating a ribbon of a conducting material, set onto the surface of a flexible article or object capable of being draped over objects or of assuming different shapes even not planar when so solicited. The second array of electrodes may be applied onto the first array of electrodes interposing a dielectric pad of an elastically compressible material in each crossing zone between an electrode of the first array and an electrode of the second array.

According to a further embodiment, each dielectric pad of an elastically compressible material may comprise metal caps on both faces that are thus contacted by a ribbon or thread of conducting material that is incorporated in the respective adhesive tape of one array or of the other array. Substantially, in direct and intimate association to a flexible and even pliable article such as a fabric or a multilayer that may even incorporate a layer of an elastically compressible material, an array of capacitors ordered in rows and columns is realized whose electric connection lines are individually selectable such to allow a measure of the capacitance of a single selected capacitor, established by the superpositions on a certain area of intersection of a selected row conductor and of a column conductor.

The whole area of the array or matrix of capacitors on the pliable and flexible object may be analyzed pixel by pixel (measures of single selected pixel capacitances). Independently from the shape momentarily or permanently assumed by the flexible and/or pliable object and thus from the "static" stresses that may be induced by the plates of the single pixel capacitors to the respective electrical compressible dielectric layer, effects that may be partially or completely filtered out or compensated by the detection circuitry, the scanning of all pixels (capacitors) of the so constituted array may provide a map representation of the distribution of the pressure i.e. of the relative values of the pressure being exerted at each pixel sensing capacitors distributed onto a complex surface of the flexible and/or pliable object.

The plate electrodes, whether in the form of threads of conducting material, woven with threads of a dielectric material to keep them electrically isolated from each other, or thin ribbons of conducting material incorporated in an adhesive tape of a dielectric material or stripes of a conductive paint, are flexible and/or pliable into the different shapes that may be assumed by the fabric or in general by the support material whether in the form of a textile fabric or of another kind and do not cause any substantial stiffening of the flexible and/or pliable object onto which they are applied or are part of.

Appropriate terminal connectors permit the individual connection of each row and of each column plate electrode to as many pins of a selection circuit for selecting a row line and a column line, according to a pre-ordered scanning scheme per single pixels of all capacitors (crossing points), and appropriate biasing and measuring circuits determine the current value of capacitance of each pixel capacitor.

The read circuitry eventually produces a digital data stream relative to pictures of the distribution map of the pressure onto the bidimensional sensor, in terms of relative and/or absolute pressure that are generated in a real time made by the device of the invention, at a certain "frame frequency".

DETAILED DESCRIPTION OF THE PREFERRED EMBODIMENTS

Figure 1:
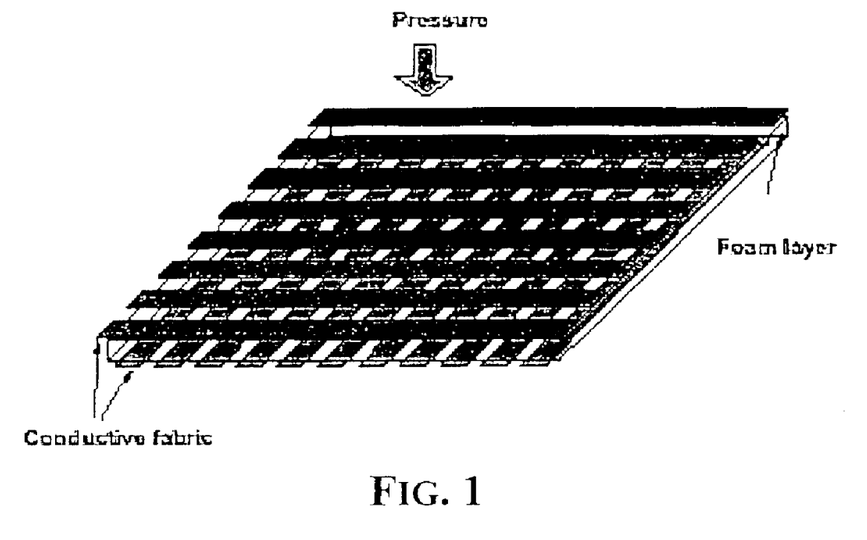
FIG. 1 is a schematic diagram of the structure of a bidimensional pressure sensor of the invention.

FIG. 1 depicts the structure of a bidimensional pressure sensor having a textile structure according to a first embodiment of the present invention. The object with textile characteristics and thus substantially flexible and pliable in a certain geometric shape, generally not a planar shape, for example for dressing a toy or a robot, is, according to this embodiment, formed by a composite comprising at least two fabrics each of them having flexible weft or warp threads, plates or ribbons of an electrically conductive material woven with flexible threads, plates or ribbons of an electrically insulating material such to keep each conductive ribbon or thread spaced and electrically isolated from the adjacent ones.

The two substantially identical fabrics with the above described characteristics are permanently fastened, for example by bonding, welding or by sewing onto the opposite faces of a sheet of an elastically compressible material. Such an elastically compressible sheet or layer may be of any non conductive material having appropriate properties of pliability and elasticity when subjected to a compression, such as for example a sheet of neoprene, a sheet of latex or of expanded elastic plastic material or of any other functionally equivalent dielectric material.

The conductive threads or ribbons of each fabric (Conductive fabric) constitute as many parallel plate electrodes spaced from each other that realize in the superposition or crossover points (crossing points) with the parallel plate electrodes of the second fabric fastened onto the opposite face of the elastically compressible layer (Foam layer) and oriented in an orthogonal direction in respect to the plate electrodes of the first fabric, an array of pixel capacitors, on the areas of superposition (crossing points). The plates represented by the conductive threads or ribbons of one and of the other set of electrodes at a certain crossing point will be spaced by a distance, substantially equivalent to the "rest" thickness of the elastically compressible dielectric layer (Foam layer) interposed between the two fabrics, that will vary in function of the pressure locally exerted at that point of the surface of the bidimensional sensor coinciding a certain capacitor i.e. with a certain pixel capacitor of the capacitor array sensor thus realized.

Of course, it is not necessary for the two sets of orthogonal plate electrodes to be formed by electrodes perfectly parallel and/or equally spaced between them. In practice and according to needs, the electrodes of each set (each "Conductive fabric" in the case of the composite structure of FIG. 1) may even be not perfectly parallel nor uniformly spaced and they may be woven even with intervening spacing threads and/or ribbons of insulating material according to any pattern that may realize, in cooperation with the second fabric fastened on the opposite face of the elastically compressible layer (Foam layer), an array of capacitive pixel elements sensible to the pressure locally exerted onto them.

Figure 2:
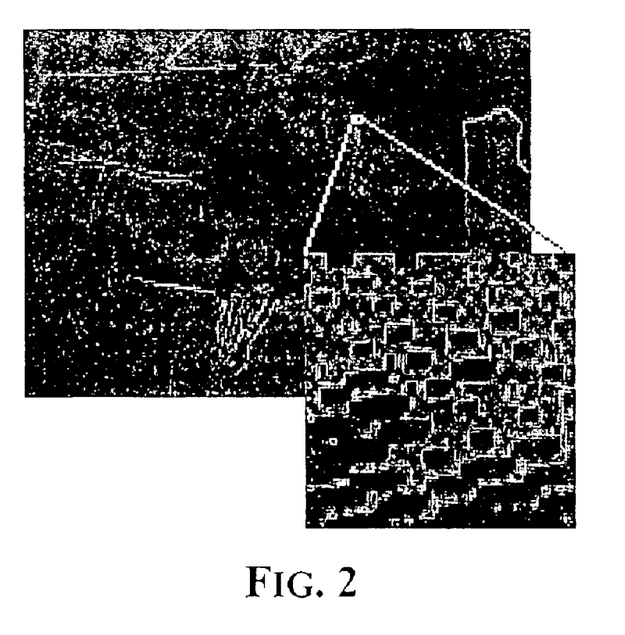
FIG. 2 is an image showing a textile technique of realization of a bidimensional sensor of the invention.

FIG. 2 depicts an embodiment of a fabric with "quasi parallel" and not uniformly spaced conductive elements forming patterns of different tonality.

Commonly, in the case of a textile embodiment of the two generally orthogonal sets of parallel or almost parallel plate electrodes, a resolution of about 200 µm may be easily obtained both for the width as well as for the separation distance between adjacent plate electrodes (similarly for row and column plates). Each plate electrode of conductive material is preferably realized by a plurality of threads or of a plate of very thin threads or by a ribbon such to result perfectly flexible and pliable and not to stiffen the resulting composite object. Of course it is also possible to produce a certain pattern of conductive threads in a fabric by embroidery techniques using conductive threads or plates or ribbons.

Electrical connection of each plate electrode of both orthogonal sets of plate electrodes may be realized along a side of the fabric, via soldered connection wires for each plate electrode to a respective pad of a printed circuit board or of a suitable multi-wire connector. The connection wires may be bundled together and fastened along the border of the relative fabric.

Figure 3:
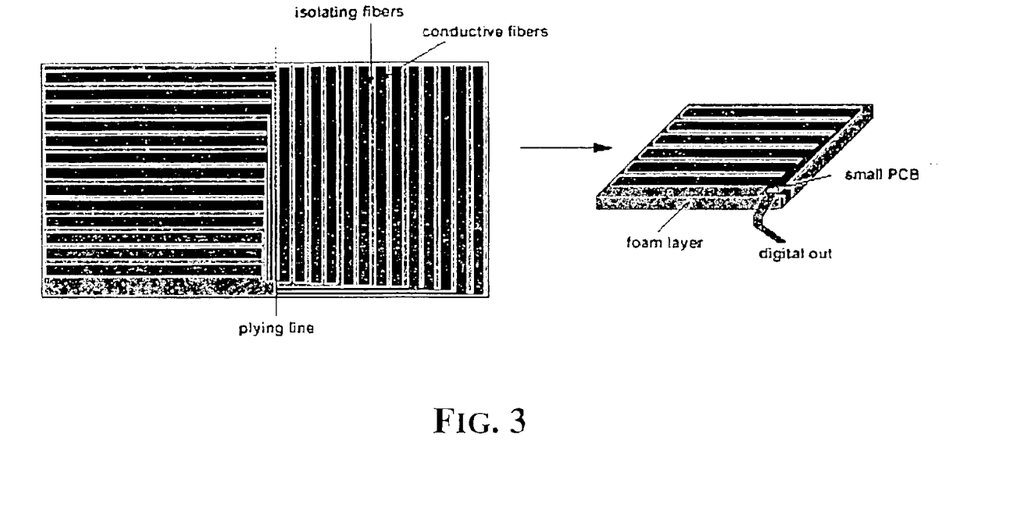
FIG. 3 is a schematic diagram of a sensor of the invention realized with stripes of conductive paint.

Alternatively, instead of realizing the two orthogonal sets of electrodes by weaving conductive threads or ribbons along with isolating threads or ribbons, the electrodes may be realized with stripes of conductive paint applied onto a face of a substrate fabric, using for example a mask or a so-called "air brushing" painting technique. This alternative approach may be useful to realize particularly complex patterns onto a single portion of fabric eventually to be plied as depicted in FIG. 3.

Figure 4:
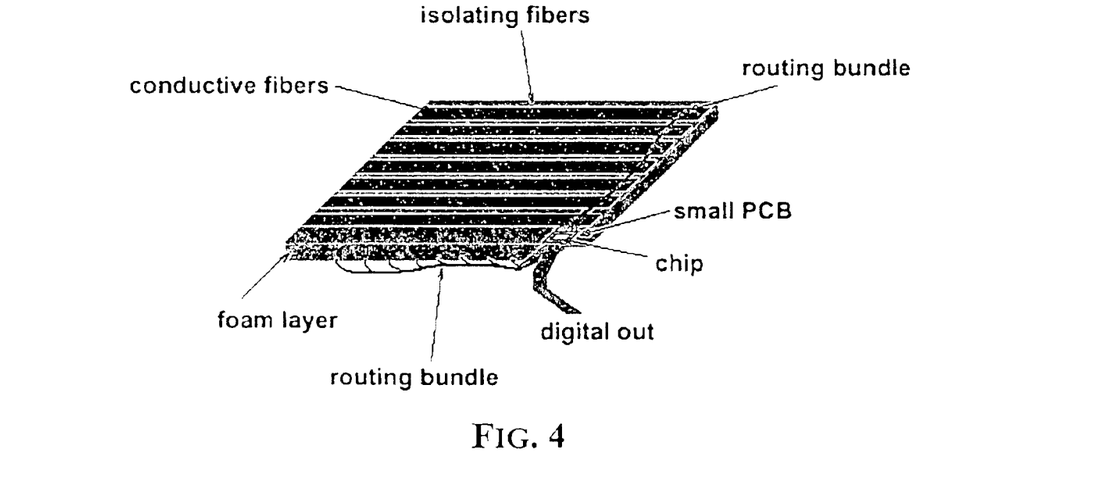
FIG. 4 is a schematic diagram showing an alternative form of routing the connections of the single electrodes of the two sets of electrodes of the sensor.

A diagram of organization of the connections is depicted in FIG. 4, whereon the presence of a device (chip) for addressing the single pixels, stimulating, reading and A/D converting the capacitance data mounted onto the printed circuit board (small PCB) and, from which the output stream bus (digital out) of data read by the sensor branches off, is highlighted. The position of the printed circuit board (small PCB) carrying the integrated circuit for addressing, stimulating and reading the sensor by pixel, may be in a most appropriate corner of the array sensor or in any other appropriate position on or inside the object incorporating the bidimensional pressure sensor of the invention, toward which are routed the bundles of connection wires or tracks of all the single plate electrodes. Of course, any suitable type of multiwire connector may be used to establish the necessary connections.

Figure 5A:
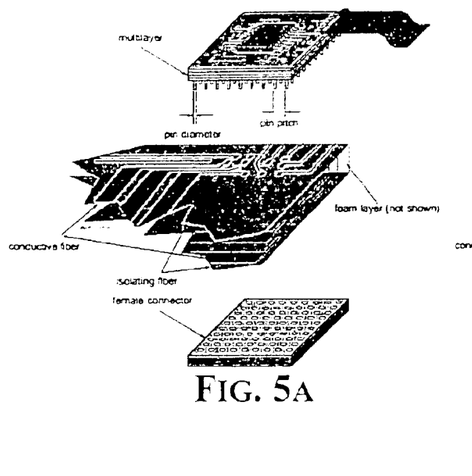
FIGS. 5a and 5b are schematic diagrams depicting two alternative forms of incorporation into the object of the device for reading pressure data from the capacitor array sensor.
Figure 5B:
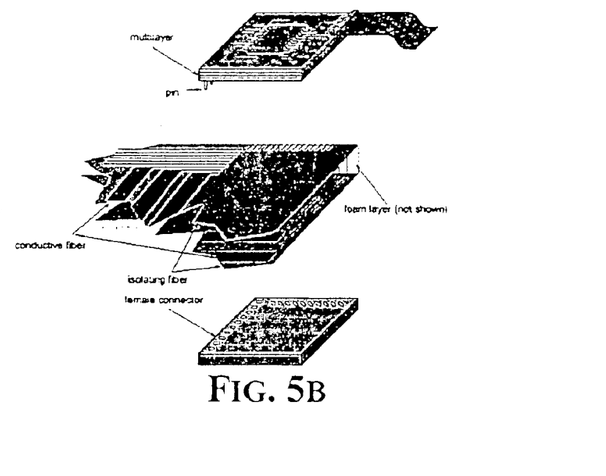

An embodiment of connection through a female socket connector permanently fastened in the area of confluence of the bundles of connecting wires or of stripes of conductive paint of all the plate electrodes, onto which a multilayered printed circuit board carrying the integrated circuit for scanning, stimulating and measuring the capacitances may be readily plugged-in, is depicted in FIG. 5a. An alternative organization of the contacts is depicted in FIG. 5b.

At the end of the assembling of the printed circuit board carrying the integrated circuit for scanning stimulating, reading and A/D converting the capacitance data, of a protective isolating layer may be applied over the whole area of electrical terminations, soldered connections, contacts, etc., by thermal welding or by deposition, according to common techniques used for applying a finishing protecting film to "artworks".

The circuits for scanning, stimulating and reading in a sequential manner the pixels of the bidimensional capacitive sensor of the invention may be different. In any case it is preferable to integrate the whole control circuit for the sequential addressing of the row and column plates, for stimulating and reading the pixel capacitances at the crossings between a selected column plate and a selected row plate and for carrying out the relative analog to digital conversion of the read datum, in a single chip.

Figure 6:
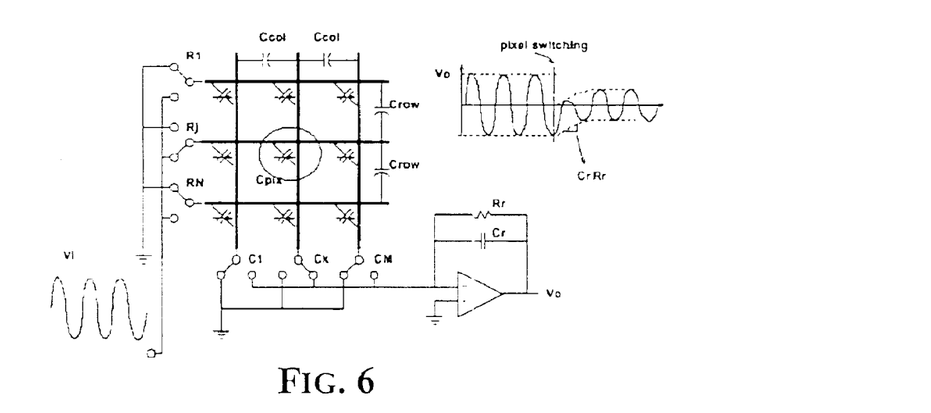
FIG. 6 is a schematic diagram of AC stimulation and reading.

The stimulation or electrical biasing and the determination of the capacitance of each selected pixel capacitor may be carried out in an AC made, according to diagram of FIG. 6. more particularly, the read principle for reading the capacitive array sensor is depicted in FIG. 6. According to this mode, a sinusoidal wave is applied to the column line or plate of the selected pixel such that the charge variation onto the row line or plate of the selected pixel is read by a charge amplifier. The resulting peak-to-peak value of the sinusoidal output wave encodes the value of the capacitance of the addressed node (pixel).

The value of the read pixel capacitance $C_{PIX}$ is tied to the pressure P by the following relation:

$$C_{PIX}(P) = S \in /d_0 - kP$$

wherein S is the area of the facing plates, $\in$ is the dielectric constant, k is a constant tied to a first order approximation of the elastic deformability characteristic of the isolating material and $d_0$ the distance of the plates at null pressure.

The reason for the presence of the feedback resistance $R_r$ is the fact that when the switches are enabled to address the pixel, the input sinusoidal wave will not be, in general, at its mean value, thus injecting a constant offset charge into the amplifier, which could saturate. By connecting a resistance in the feedback loop, the offset is surely made null after a certain time interval. In other words, when the resistance is connected as in the above illustrated configuration, the amplifier acts as a high pass filter with a canonic transfer function:

$$H(j\omega) = \frac{V_o}{V_i}(j\omega) = \frac{j\omega R_r C_{pix}}{1 + j\frac{\omega}{\omega_r}}$$

wherein $\omega_r = 1/R_r C_r$

In other words the offset due to the switching time will decay with a time constant $\tau = R_r C_r$. The output peak-to-peak amplitude, on the contrary, will switch almost instantaneously to the new value, because the frequency of the sinusoidal input is in the pass band of the relative high pass filter.

It should be noted that the charge injected in the virtual ground node of the operational amplifier should depend only on the pixel capacitance. Therefore injection from the large parasitic capacitances of neighboring columns ($C_{COL}$)

should be eliminated, as well as the injection from deselected pixels of the same column. Given that the virtual ground node is at a pre-established level:

by grounding all columns except the selected column, charge injection from the neighbouring columns, caused by $C_{COL}$, is effectively prevented;

by grounding all the rows except the selected row, charge injection from pixels of the same column is effectively prevented.

This is of outstanding importance to obtain a good signal/noise ratio and consequently a good contrast of the picture of the map distribution of the pressure, given that typically $C_{PIX}$ is smaller than $C_{COL}$ of an order of magnitude, and the total capacitance of the deselected pixels of the same column is at rest equal to the number of rows less one (N−1) times the single pixel capacitance and may often become two orders of magnitude larger than $C_{PIX}$.

The output sinusoidal wave may be filtered, rectified and digitized using commonly known circuits for these processings.

Figure 7:
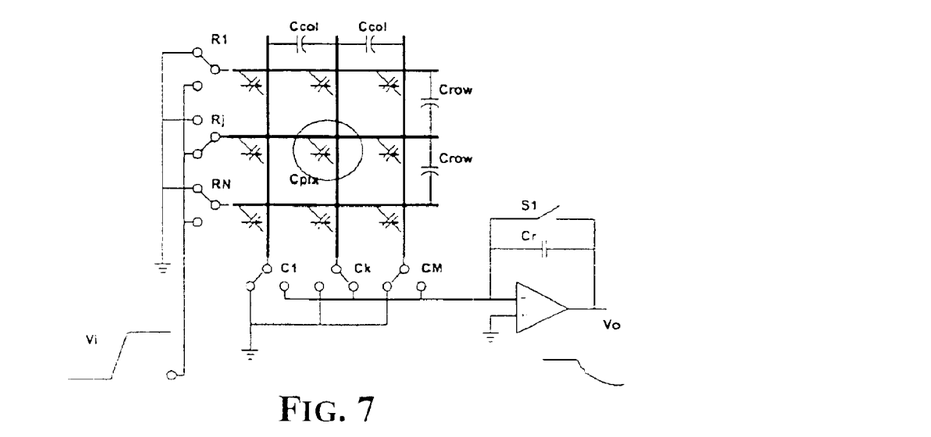
FIG. 7 is a schematic diagram of DC stimulation and reading.

Alternatively the stimulation and the measure of capacitance may be performed in a DC mode as depicted in the diagram of FIG. 7, that is similar under many aspects to the diagram of the previous FIG. 6. The operation is as follows. The feedback switch S1 is first closed to reset the operational amplifier. S1 is subsequently opened and a step voltage is applied to the row line or plate electrode of the selected pixel and its charging is read on the column plate electrode.

An advantage of this architecture in respect to the previous one consists in the fact that it may be more easily integrated in VLSI. On the other hand, provided that a step voltage has a complex spectrum, this reading mode is much more sensible to "bulk" noise, while according to the previous approach band pass filters tuned at the input frequency may be used to filter the signal from the wide band noise due for example to the scanning digital circuits integrated on the same chip.

The device of the invention may be realized by using two pieces of fabric with parallel conducting threads fastened onto the opposite faces of a sheet of elastically compressible expanded plastic material, according to the structure depicted in FIG. 1. The width and the spacing of the parallel electrodes of conductive threads woven with non conductive threads were respectively of 3 mm and of 5 mm. The thickness of the sheet of elastically compressible foam was of 3 mm at rest.

Figure 8:
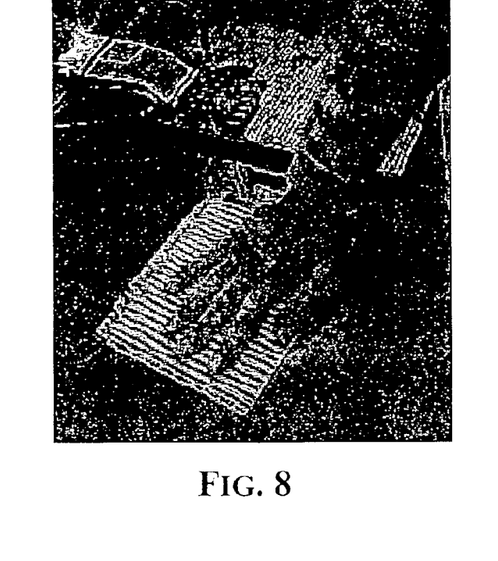
FIG. 8 is an image depicting a prototype of a pressure sensor of the invention.
Figure 9:
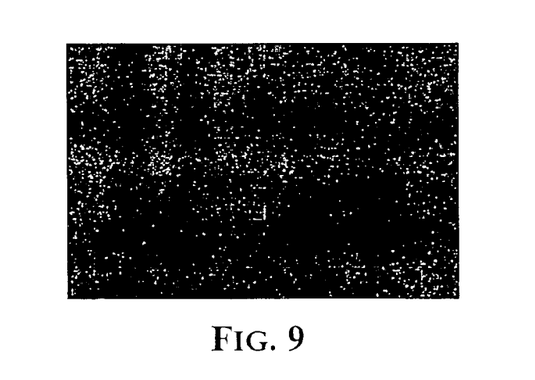
FIGS. 9 and 10 are distribution maps of the pressure when pressure is exerted with the palm of a hand and with a fist, respectively.
Figure 10:
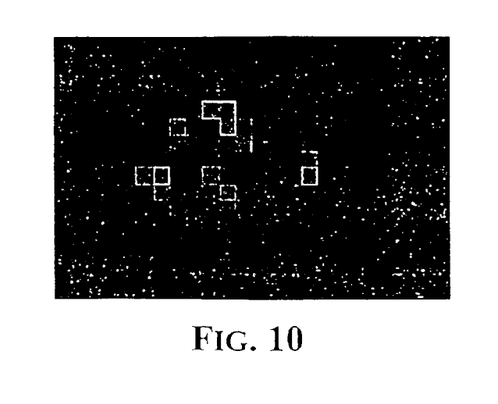
Figure 11:
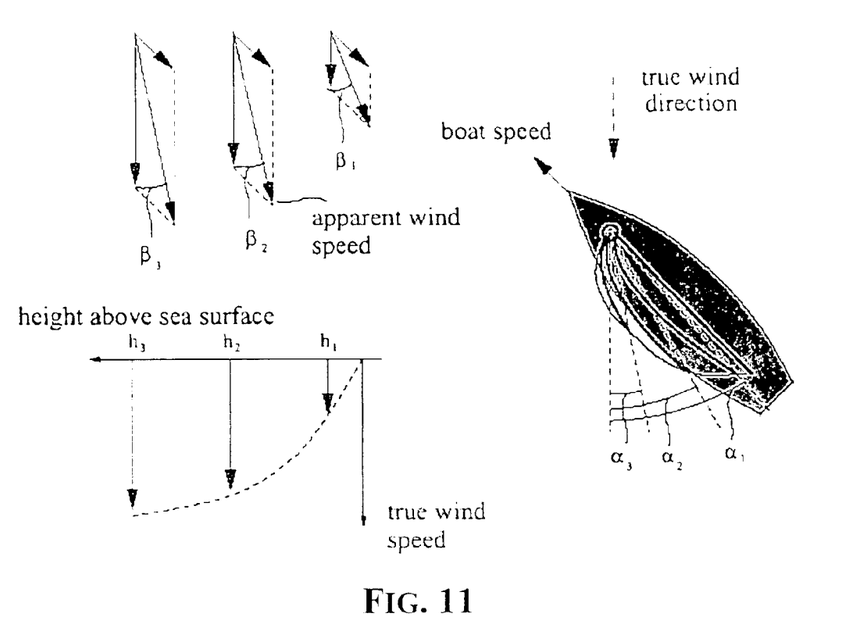
FIG. 11 is a schematic diagram illustrating the criteria of optimization of the angle of incidence of a sail in respect to the direction of the real wind.

The sequential scan circuit of the single column and row plate electrodes commonly used MOS transistors and the read element was an operational amplifier implementing an AC scheme as the one depicted in FIG. 6, using a stimulation sinusoidal waveform with frequency of 100 KHz. The signal output by the charge amplifier was first rectified and then converted by a common analog/digital converter. The data stream was received by a general purposes data acquisition card of National Instrument and the pictures and the distribution map of the pressure were displayed in real time at a frame frequency of 3 F/s on the monitor of a PC. A prototype is depicted in FIG. 8 and the distribution maps relative to the pressure exerted onto the sensor by the open palm of the hand and by the fist are reproduced in FIGS. 9 and 10.

A particularly interesting area of application of the method and of the device of the invention is that of the optimization of the shape and of the orientation of a sail in respect to the apparent wind to enhance propulsion of the ship. Without digressing over a detailed analysis of the many factors that influence the efficiency of a sail under different points of sailing, it will be sufficient to recall that all regulations that are carried out in function of wind condition and of the point of sailing to produce the most efficient shape of the sail as well as naturally to adjust its orientation in respect to the direction of the apparent wind, are directed to maximize the lift component of the force exerted by the wind onto the sail and consequently the propulsion of the ship.

Regulations are normally carried out on the base of a direct observation by the expert skipper, often using tell-tale indicators of an eventual insurgence of turbulent air flow over certain portions of the sail, indicative of a loss of efficiency. These indicators are often lightweight ribbons sewed at significant points of the sail surface and that are feathered "as a flag" by the air flow, indicating eventually a condition of laminar flow or of turbulent flow. Devices of this type are described for example in the U.S. Pat. No. 5,877,415.

Automatic regulation devices capable of elaborating an automatically detected information have been proposed, such as the tension and the eventual presence of vibrations of the sheet of a sail, as disclosed in U.S. Pat. No. 4,671,201.

A device to detect instrumentally the primary parameter i.e. the differential pressure of the air onto the leeward and windward faces at a significant point of a sail has also been proposed in the U.S. Pat. No. 3,763,703. The device consists of two capillaries, one placed close to one face and the other close to the opposite face of the sail, with their inlet oriented toward the air flow over the respective face of the sail and determining, via a differential measuring device the static pressure difference on the leeward face and the windward face of the sail.

It is evident that even such a device for monitoring the air pressure onto both faces of the sail is able to produce on useful indication though valid solely for the point at which the two capillaries are fixed on the opposite faces of the sail.

On the other hand, as a sailor knows, the pressure exerted on a sail varies considerably from zone to zone also in function of the particular point of sailing (incidence angle of the sail in respect to the direction of the apparent wind). In particular, a sail as a triangular main sail has several possibilities of adjustment of its shape to make it more or less "fat" and to increase or reduce its torsion starting from its tack on its upper leech, in proximity of its halyard corner.

Therefore, to optimize the shape and orientation of the sail it is fundamental to know not only a single value of differential pressure of the air pressure acting onto the windward side and onto the leeward side, but ideally to have a picture of the distribution map of the pressure over the whole sail surface or at least over a considerable portion of it.

Figure 12:
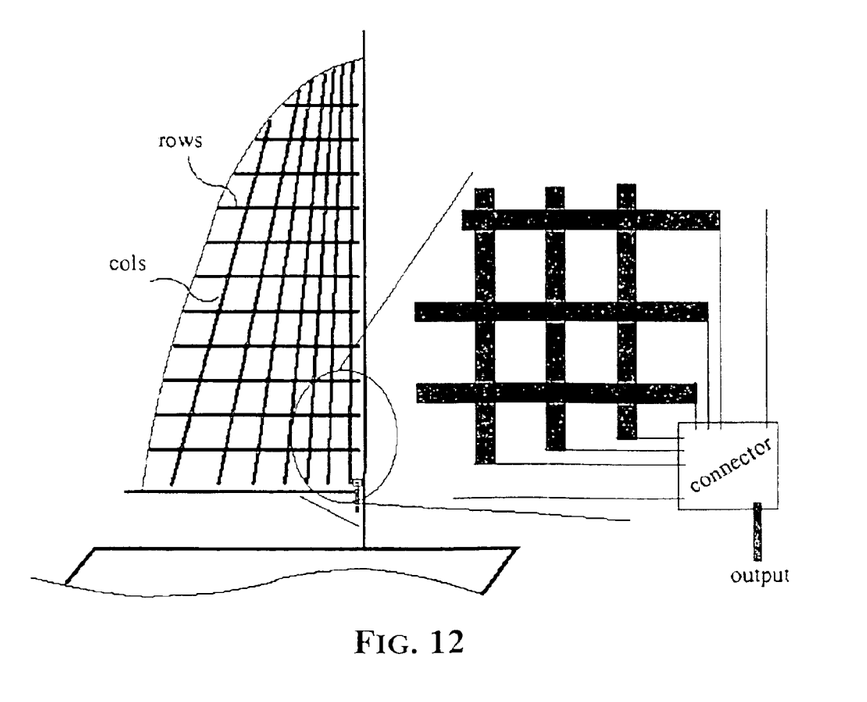
FIG. 12 is a schematic diagram depicting a sail equipped with a bidimensional pressure sensor of the invention.

This particular requirement is outstandingly fulfilled by the method and the device of the present invention. A sail, for example a triangular main sail equipped with a bidimensional pressure sensor of the invention is schematically depicted in FIG. 12. A sail is preferably equipped with a sensor, that is with an array of pixel capacitors over both faces.

According to this invention, each sensor is made of two orthogonal sets of parallel or substantially parallel plate electrodes. Each set of electrodes is preferably constituted by a plurality of stripes of adhesive tape incorporating a wire or a ribbon of a conducting material, applied onto the sail surface. The other set of electrodes is applied over the first set of electrodes interposing in each crossing zone between a plate electrode of the first set and a plate electrode of the second set a dielectric and elastically compressible pad.

The conductor incorporated in the adhesive tape may be a ribbon of aluminum foil, eventually coated or anodized.

The elastically compressible pads may be simple patches or pieces of a relatively soft elastic lattice or foam. Most preferably, each dielectric elastically compressible pad is constituted by a substantially round plastic cushion the opposite faces of which are elastically flexible filled with air or with another suitable gas, such that the cushion may expand or shrink depending on the pressure of the air streaming over the sail's surface.

Figure 13:
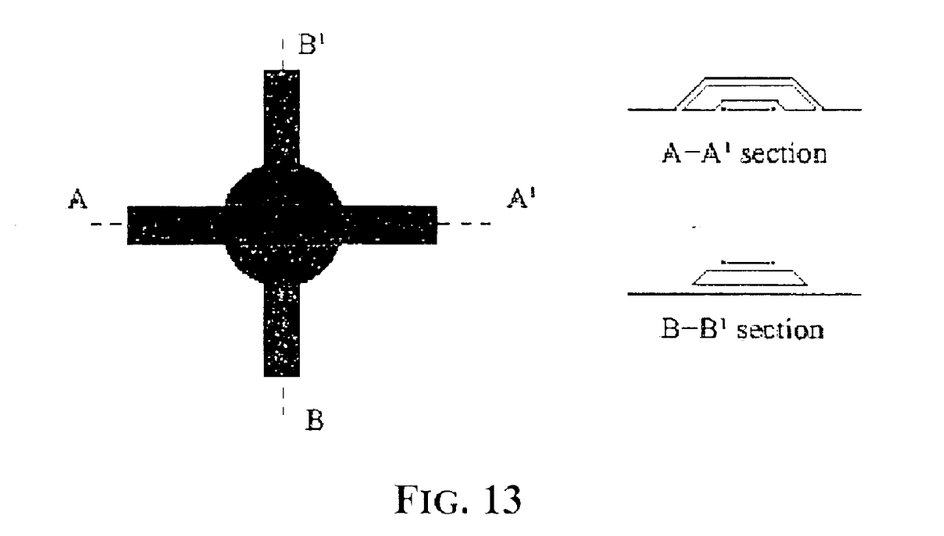
FIG. 13 is a schematic diagram depicting a preferred form of each pixel capacitor of the sensor.

Each dielectric elastic pad may even comprise a flexible metal coating over both faces functioning as the plate electrodes of the relative pixel capacitor, electrically contacted by the conductive wire or metal ribbon core incorporated in the respective adhesive tape of one or of the other sets of plate electrodes of the sensor array. FIG. 13 depicts a plan view and two orthogonal sections of a pixel capacitor constituted at the crossing between a row plate electrode and a column plate electrode with the interposition of an elastic gas filled cushion.

Figure 14:
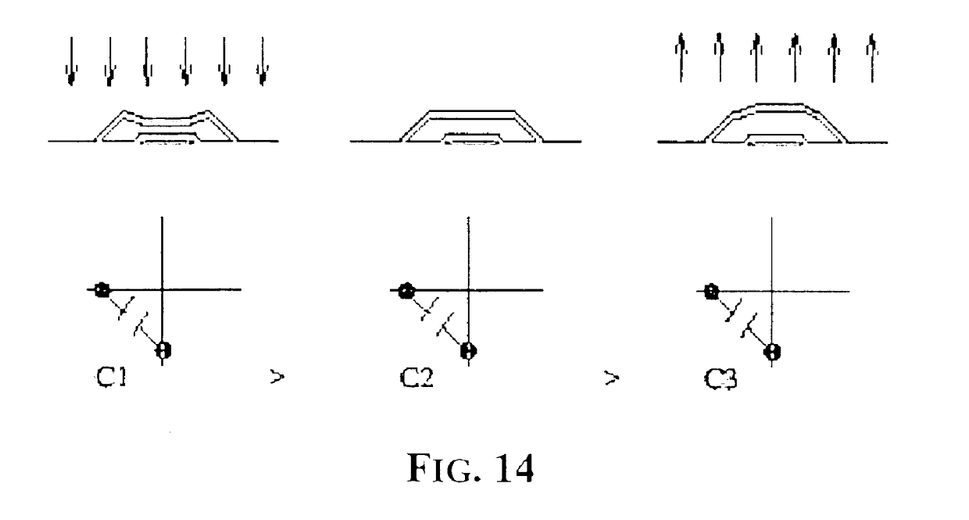
FIG. 14 is a schematic diagram depicting the variation of the capacitance at each pixel of the sensor when the pressure exerted by the apparent wind varies.

FIG. 14 depicts schematically the variation of the equivalent capacitance that is measured under different conditions of deformation of the elastically compressible and expandable dielectric pad of each pixel capacitor.

Figure 15:
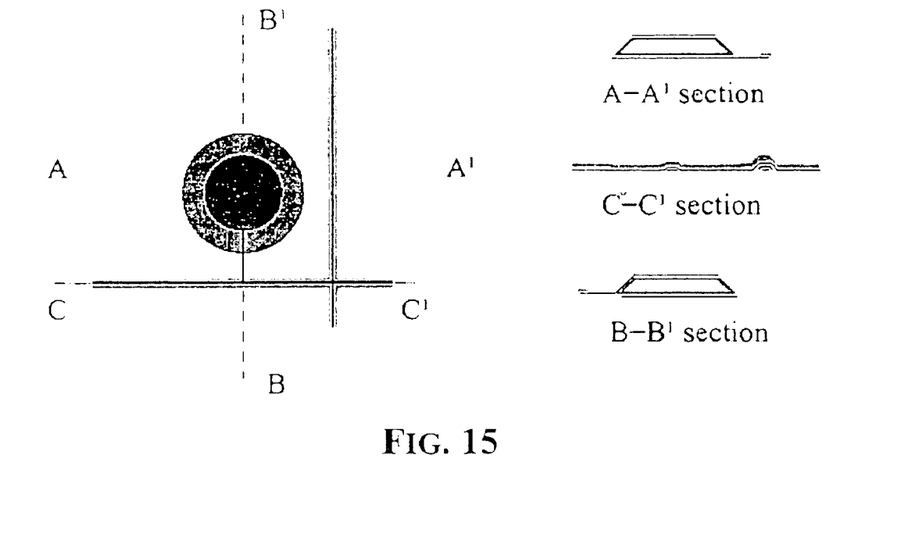
FIG. 15 is a schematic diagram showing the structure of each pixel capacitor of the sensor according to an alternative embodiment.
Figure 16:
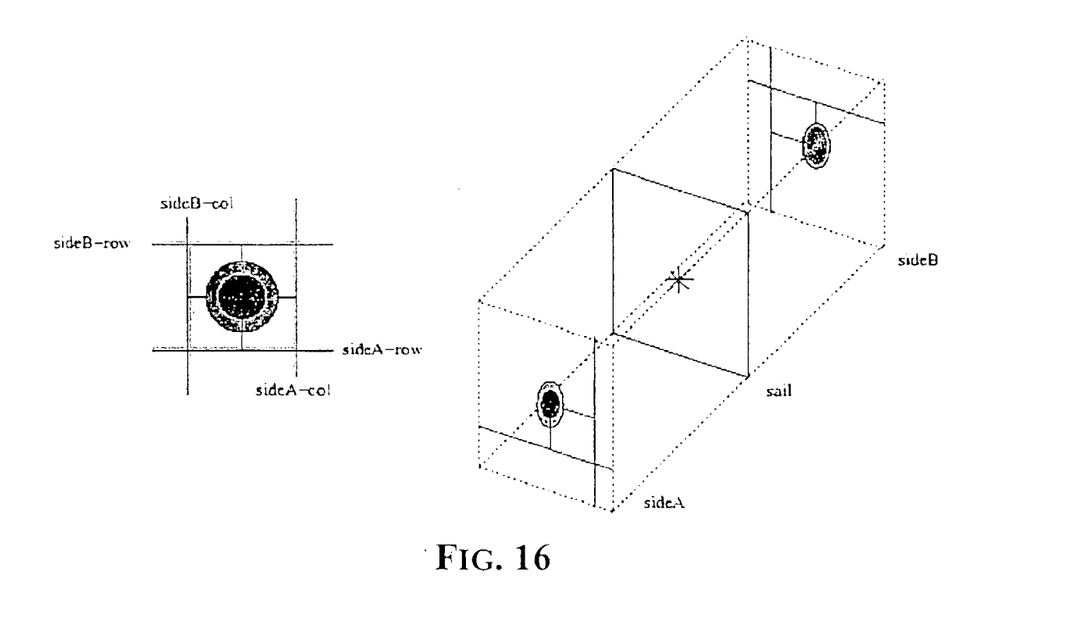
FIG. 16 is a schematic diagram depicting the connection scheme of each pixel capacitor of FIG. 15 of the bidimensional array sensor of the invention.

The alternative embodiment, according to which each elastically compressible and expandable dielectric pad is provided with an extremely thin metal coating over the opposite faces thereof, such to not to compromise the ability of the gas filled cushion faces to flex in function of the pressure difference between the internal fluid of the cushion and the outer air, is depicted in FIG. 15, including a plan view and two orthogonal cross sections of a pixel capacitor of the sensor of the invention.

In this case, the metallization layers present on the opposite faces of the elastically compressible and expandable cushion constitute the plates of the pixel capacitor and the electrical connection of each so pre-constituted pixel capacitor by way of a respective column line and a respective row line of the array of pixel capacitors is established by contacting the plates with the conductive wire incorporated in the adhesive tape of the respective column line and row line.

Even in this case the array sensor is coupled, as schematically depicted in FIG. 12, through connecting wires of the single lines of column and row plates to as many pins or input pads of a connector onto which may be installed a printed circuit card with the integrated circuit device for selectively and/or sequentially addressing, stimulating and reading the capacitances of the single pixel capacitors of the array. The elements that constitute the system for scanning, stimulating, reading and converting the read capacitance data may be installed near the tack angle of the sail, as depicted in FIG. 12.

Of course, the integrated system may be the same that has already been described in relation to other embodiments and other applications of the sensor of the invention.

Of course, the integrated system may read both sensor arrays placed over the opposite faces of the sail and output distribution maps of the pressure on one face and on the other face of the sail and/or eventually produce a differential pressure distribution map, by subtracting from the capacitance values of pixels of the array on the windward face of the sail the capacitance values of corresponding pixels of the array on the leeward face of the sail.

That which is claimed is:

1. A device for detecting pressure exerted at different points of a flexible object, the device comprising;
    an array of pressure sensing pixel capacitors comprising column electrodes and row electrodes orthogonal to each other, and a plurality of individually spaced apart elastically compressible dielectric pads positioned between each respective crossing of the column electrodes and row electrodes; and
    a system for biasing and reading the capacitance of the pressure sensing pixel capacitors, and comprising column electrode selection circuits,
        row electrode selection circuits, and
        a logic circuit connected to the column and row electrode selection circuits for sequentially scanning the pressure sensing pixel capacitors and outputting pixel values of the pressure for constructing a distribution map of the pressure over an area of the array.

2. The device of claim 1, wherein the column electrodes and row electrodes each comprise a fabric including weft oriented threads of dielectric material and warp oriented threads alternately of a conducting material and of a dielectric material.

3. The device of claim 1, wherein the column electrodes and row electrodes each comprise parallel stripes of conductive paint.

4. The device of claim 1, wherein the column electrodes and row electrodes each comprise a plurality of stripes of adhesive tape incorporating a thread of conductive material, the stripes of adhesive tape being laid over each other with the respective elastically compressible dielectric pad interposed at each crossing.

5. The device of claim 4, wherein the respective elastically compressible dielectric pad has a metal coating on both faces contacted by the thread of conductive material of the respective adhesive tape of one of the column and row electrodes.

6. The device according to claim 4, wherein the respective elastically compressible dielectric pad comprises a gas filled cushion, the opposite faces of which elastically swell and shrink depending on the pressure difference between the filling gas of the cushion and ambient air.

7. The device according to claim 4, wherein the flexible object comprises a sail, and wherein the array of pressure sensing pixel capacitors is fixed on both faces thereof.

8. A bidimensional pressure sensor for producing a distribution map of pressure over a surface of a flexible object, the sensor comprising an array of pressure sensing pixel capacitors comprising column electrodes and row electrodes orthogonal to each other, and a plurality of individually spaced apart elastically compressible dielectric pads positioned between each respective crossing of the column electrodes and row electrodes, and readable by sequentially scanning the pixel capacitors.

9. The sensor of claim 8, wherein the column electrodes and row electrodes each comprise a fabric including weft oriented threads of dielectric material and warp oriented threads alternately of a conducting material and of a dielectric material.

10. The sensor of claim 8, wherein the column electrodes and row electrodes each comprise parallel stripes of conductive paint.

11. The sensor of claim 8, wherein the column electrodes and row electrodes each comprise a plurality of stripes of adhesive tape incorporating a thread of conductive material, the stripes of adhesive tape being laid over each other with the respective elastically compressible dielectric pad interposed at each crossing.

12. The sensor of claim 11, wherein the respective elastically compressible dielectric pad has a metal coating on both faces contacted by the thread of conductive material of the respective adhesive tape of one of the column and row electrodes.

13. The sensor according to claim 11, wherein the respective elastically compressible dielectric pad comprises a gas filled cushion, the opposite faces of which elastically swell and shrink depending on the pressure difference between the filling gas of the cushion and ambient air.

14. A method of detecting pressure over a surface of a flexible object, the method comprising:

provilding an array of pressure sensing pixel capacitors on the object and comprising column electrodes and row electrodes orthogonal to each other, and a plurality of individually spaced apart elastically compressible dielectric pads positioned between each respective crossing of the column electrodes and row electrodes; and scanning the pressure sensing pixel capacitors to detect the pressure over the surface of the flexible object.

15. The method of claim 14, wherein the column electrodes and row electrodes each comprise a fabric including weft oriented threads of dielectric material and warp oriented threads alternately of a conducting material and of a dielectric material.

16. The method of claim 14, wherein the column electrodes and row electrodes each comprise parallel stripes of conductive paint.

17. The method of claim 14, wherein the column electrodes and row electrodes each comprise a plurality of stripes of adhesive tape incorporating a thread of conductive material, the stripes of adhesive tape being laid over each other with the respective elastically compressible dielectric pad interposed at each crossing.

18. The method of claim 17, wherein the respective elastically compressible dielectric pad has a metal coating on both faces contacted by the thread of conductive material of the respective adhesive tape of one of the column and row electrodes.

19. The method according to claim 17, wherein the respective elastically compressible dielectric pad comprises a gas filled cushion, the opposite faces of which elastically swell and shrink depending on the pressure difference between the filling gas of the cushion and ambient air.

20. A method of trimming a sail to maximize net pressure acting on the windward face of the sail, the method comprising:

providing an array of pressure sensing pixel capacitors on the sail and comprising column electrodes and row electrodes orthogonal to each other, and a plurality of individually spaced apart elastically compressible dielectric pads positioned between each respective crossing of the column electrodes and row electrodes;

scanning the pressure sensing pixel capacitors to detect the pressure over the surface of the sail; and producing real time distribution maps of the detected pressure over at least a substantial portion of the sail surface on a display.

21. The method of claim 20, wherein providing the array of pressure sensing pixel capacitors comprises applying the array of pressure sensing pixel capacitors on both faces of the sail; and wherein producing real time distribution maps comprises producing distribution maps of differential pressure on the windward and on the leeward face of the sail.

22. A bidimensional pressure sensor for producing a distribution map of pressure over a surface of a flexible object, the sensor comprising an array of pressure sensing pixel capacitors comprising column electrodes and row electrodes orthogonal to each other and spaced, at least at each crossing between a column electrode and a row electrode, by an elastically compressible dielectric, and readable by sequentially scanning the pixel capacitors;

the column electrodes and row electrodes each comprise a plurality of stripes of adhesive tape incorporating a thread of conductive material, the stripes of adhesive tape being laid over each other with the elastically compressible dielectric interposed at each crossing; and the elastically compressible dielectric has a metal coating on both faces contacted by the thread of conductive material of the respective adhesive tape of one of the column and row electrodes.

23. The sensor of claim 22, wherein the column electrode and row electrodes each comprise a fabric including weft oriented threads of dielectric material and warp oriented threads alternately of a conducting material and of a dielectric material, the fabrics being fastened onto opposite faces of the elastically compressible dielectric.

24. The sensor of claim 22, wherein the column electrodes and row electrodes each comprise parallel stripes of conductive paint applied onto a respective face of the elastically compressible dielectric.

* * * * *